US012752704B2

(12) United States Patent
Tong et al.

(10) Patent No.: US 12,752,704 B2
(45) Date of Patent: Oct. 6, 2026

(54) SMART VEHICLE SYSTEMS AND CONTROL LOGIC WITH AUTOMATED LANE MERGING ASSISTANCE

(71) Applicant: GM GLOBAL TECHNOLOGY OPERATIONS LLC, Detroit, MI (US)

(72) Inventors: Wei Tong, Troy, MI (US); Donald K. Grimm, Utica, MI (US); Xiaofeng F. Song, Novi, MI (US); Shuqing Zeng, Sterling Heights, MI (US); Julien P. Mourou, Bloomfield Hills, MI (US); Charles R. Quinn, Pleasant Ridge, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 53 days.

(21) Appl. No.: 18/923,916

(22) Filed: Oct. 23, 2024

(65) Prior Publication Data

US 2026/0109293 A1 Apr. 23, 2026

(51) Int. Cl.
*B60R 1/02* (2006.01)
*B60R 1/00* (2022.01)
(Continued)

(52) U.S. Cl.
CPC .............. *B60R 1/025* (2013.01); *B60R 1/006* (2013.01); *B60W 50/14* (2013.01); *G01C 21/30* (2013.01);
(Continued)

(58) Field of Classification Search
CPC ........ B60R 1/025; B60R 1/006; B60W 50/14; B60W 2710/30; G01C 21/30; H04W 4/029
(Continued)

(56) References Cited

U.S. PATENT DOCUMENTS

| | | | |
|---|---|---|---|
| 8,260,515 | B2 | 9/2012 | Huang et al. |
| 8,352,112 | B2 | 1/2013 | Mudalige |

(Continued)

FOREIGN PATENT DOCUMENTS

| | | | |
|---|---|---|---|
| DE | 10016222 | A1 | 10/2001 |
| DE | 602005000360 | T2 | 10/2007 |

(Continued)

*Primary Examiner* — Maceeh Anwari
(74) *Attorney, Agent, or Firm* — Quinn IP Law

(57) ABSTRACT

Presented are smart vehicle systems and control logic that provide automated lane merging assistance, methods for making/using such systems, and vehicles equipped with such systems. A method of operating a motor vehicle includes a vehicle controller communicating with a host vehicle tracking device to receive therefrom location data indicative of the motor vehicle's current location. Using this location data and a digital roadway map, the controller maps the motor vehicle's location to a vehicle roadway and concomitantly detects a lane merging event responsive to the host vehicle's location coinciding with a roadway segment that is merging with another roadway lane segment at a lane merging point. Responsive to detecting a lane merging event, the controller determines a new mirror angle for a driver mirror and concurrently commands a mirror actuator to move the driver mirror to the new mirror angle prior to the motor vehicle reaching the lane merging point.

19 Claims, 4 Drawing Sheets

(51) Int. Cl.
*B60W 50/14* (2020.01)
*G01C 21/30* (2006.01)
*H04W 4/029* (2018.01)

(52) U.S. Cl.
CPC ........ *H04W 4/029* (2018.02); *B60W 2710/30* (2013.01)

(58) Field of Classification Search
USPC ............................................................ 701/49
See application file for complete search history.

(56) References Cited

U.S. PATENT DOCUMENTS

| | | | | |
|---|---|---|---|---|
| 8,788,134 | B1 | 7/2014 | Litkouhi et al. | |
| 8,810,431 | B2 | 8/2014 | Mudalige et al. | |
| 10,062,288 | B2 | 8/2018 | Litkouhi et al. | |
| 10,864,910 | B2 | 12/2020 | Adam et al. | |
| 10,940,863 | B2 | 3/2021 | Palanisamy et al. | |
| 11,052,914 | B2 | 7/2021 | Mehdi et al. | |
| 11,226,620 | B2 | 1/2022 | Zhao et al. | |
| 11,370,435 | B2 | 6/2022 | Zhao et al. | |
| 2013/0099911 | A1* | 4/2013 | Mudalige | G08G 1/166 701/23 |
| 2013/0342926 | A1* | 12/2013 | Lutz | B60R 1/025 359/846 |
| 2019/0286151 | A1 | 9/2019 | Palanisamy et al. | |

FOREIGN PATENT DOCUMENTS

| | | | |
|---|---|---|---|
| DE | 102011085643 | A1 | 5/2013 |
| DE | 102016003438 | A1 | 9/2016 |
| JP | 2024-082778 | A | 6/2024 |

* cited by examiner

SMART VEHICLE SYSTEMS AND CONTROL LOGIC WITH AUTOMATED LANE MERGING ASSISTANCE

INTRODUCTION

The present disclosure relates generally to motor vehicles with automated driver assistance systems. More specifically, aspects of this disclosure relate to smart motor vehicles with control logic for executing automatic lane-merge assistance features.

Current production motor vehicles, such as the modern-day automobile, may be equipped with a network of onboard electronic devices that provide automated driving capabilities to assist drivers with vehicle operation. In automotive applications, for example, one of the most recognizable types of automated driving features is the cruise control system. Cruise control allows a vehicle operator to set a particular vehicle speed and have the onboard vehicle computer system maintain that speed without the driver operating the accelerator or brake pedals. Next-generation Adaptive Cruise Control (ACC) is an automated driving feature that regulates vehicle speed while concomitantly managing headway spacing between the host "ego" vehicle and a leading "target" vehicle. Another type of automated driving feature is the Lane Change Assist (LCA) system, which uses target detection and ranging sensors to track oncoming vehicles in adjacent lanes and warns the driver upon signaling their intent to merge into an adjacent lane. Intelligent Parking Assist Systems (IPAS), Lane Monitoring and Automated Steering ("Auto Steer") Systems, Electronic Stability Control (ESC) systems, and other Advanced Driver Assistance Systems (ADAS) are also available on many modern-day automobiles.

Lane merging events are a regular part of day-to-day operation of a motor vehicle, generally typified by two traffic lanes combining into a single traffic lane. In addition to the merging of multiple mutually parallel traffic lanes into a single lane, a lane merge event is a common occurrence for drivers attempting to enter a fast-moving highway by way of an acutely angled on-ramp. The merging maneuver is implicitly performed by the host vehicle's driver locating and tracking a lead vehicle, if any, directly forward on the on-ramp while attempting to concurrently locate and track any oncoming vehicles approaching in the highway's rightmost "acceleration" lane. The driver then coordinates merging the host vehicle in front of or behind oncoming vehicles in the acceleration lane without encroaching on the lead. In addition to the innate challenges of attempting to simultaneously locate and track multiple target vehicles in multiple lanes, a lane merging maneuver may be further complicated by inclement weather, poor road surface conditions, traffic, etc. Moreover, less-than-optimal roadway topologies of freeway on-ramps may make it challenging for a driver of a merging vehicle to see the fast-moving vehicles on the main freeway using the driver-side rearview mirror or an over-shoulder blind spot glance.

SUMMARY

Presented herein are smart vehicle systems with attendant control logic for provisioning automated lane merging assistance, methods for making and methods for operating such systems, and motor vehicles equipped with such systems. By way of non-limiting example, an onboard vehicle navigation system may actively determine when a host vehicle is approaching a lane merging point, such as the terminal end of a freeway on-ramp; an in-vehicle lane merge assist (LMA) may automatically adjust a rearview mirror and/or a sideview mirror (collectively "driver mirror") to help the driver better monitor traffic flow before the merge point. The LMA system may operate in variety of different operating modes, including a simple "fixed" LMA mode that automatically adjusts a driver mirror to a preset wide-field viewing angle, which may be selected by the driver or calibrated to the host vehicle. The LMA system may also operate in an advanced "dynamic" LMA mode that intelligently performs driver mirror adjustment to provide an optimal viewing angle based, for example, on merge location context, vehicle speed, driver preference, etc. An adaptive "continuous" LMA mode performs successive mirror angle adjustments and, if desired, intelligently renders conflict vehicles using a side blind zone indicator based, for example, on host and target vehicle speeds, trajectories, and relative locations.

Aspects of this disclosure are directed to smart vehicle control systems and ADAS control logic for provisioning automated lane merging assistance features. In an example, a method is presented for operating a subject "host" vehicle with a vehicle body, a driver mirror attached to the vehicle body, and a mirror actuator coupled to the driver mirror. This representative method includes, in any order and in any combination with any of the above and below disclosed options and features: receiving, e.g., by a resident or remote microcontroller, central processor, control module, programmable logic device, integrated circuit (IC) device, or network of processors/controllers/modules/devices/etc. (collectively "vehicle controller") from a wireless-enabled host vehicle tracking device, location data indicative of a real-time location of the host motor vehicle; mapping, e.g., via the vehicle controller using the location data and a memory-stored digital roadway map, the host vehicle's location to a vehicle roadway; detecting, e.g., via the vehicle controller, a lane merging event responsive to the host vehicle's real-time location coinciding with a roadway lane segment that is merging with an adjacent roadway lane segment at a lane merging point; determining, e.g., via the vehicle controller responsive to detecting the lane merging event, a new mirror angle for the driver mirror; and commanding, e.g., via the vehicle controller, the mirror actuator (e.g., a bidirectional electric motor, a rotary actuator, a pneumatic cylinder, etc.) to move the driver mirror to the new mirror angle before the host motor vehicle reaches the lane merging point.

Aspects of this disclosure are also directed to computer-readable media (CRM) containing controller-executable instructions for provisioning lane merging assistance to drivers of motor vehicles. In an example, a non-transient CRM stores instructions that are executable by a vehicle controller of a motor vehicle, which includes a vehicle body, a driver mirror attached to the vehicle body, and an electric mirror motor communicatively connected to the vehicle controller and drivingly coupled to the driver mirror. These CRM-stored instructions, when executed, cause the vehicle controller to perform operations, including: receiving, from a wireless-enabled host vehicle tracking device in the motor vehicle, location data indicative of a host vehicle location of the motor vehicle; mapping, using the received location data and a memory-stored digital roadway map, the host vehicle location to a vehicle roadway; detecting a lane merging event responsive to the host vehicle location coinciding with a first lane segment of the vehicle roadway merging with a second lane segment of the vehicle roadway at a lane merging point; determining, responsive to detecting the lane merging event, a new mirror angle for the driver mirror; and commanding the mirror motor to move the driver mirror to the new mirror angle prior to the motor vehicle reaching the lane merging point.

Additional aspects of this disclosure are directed to intelligent motor vehicles with automated lane-merge assistance features. As used herein, the terms "vehicle" and "motor vehicle" may be used interchangeably and synonymously to include any relevant vehicle platform, such as passenger vehicles, commercial vehicles, industrial vehicles, tracked vehicles, off-road and all-terrain vehicles (ATV), motorcycles, farm equipment, aircraft, spacecraft, e-bikes, etc. In an example, a motor vehicle includes a vehicle body with a passenger compartment, multiple road wheels attached to the vehicle body (e.g., via corner modules coupled to a unibody or body-on-frame chassis), and other standard original equipment. A prime mover, which may be in the nature of a traction motor and/or internal combustion engine assembly, is located inside the vehicle body and drives the road wheel(s) to propel the vehicle. Also attached to the vehicle body is a mirror assembly that includes a sideview and/or rearview driver mirror and a controller-automated mirror actuator that is drivingly coupled to the driver mirror.

Continuing with the discussion of the above example, the vehicle also includes a resident or remote vehicle controller that is programmed to communicate with a wireless-enabled host vehicle tracking device to receive therefrom location data indicative of a real-time location of the host motor vehicle. Using this location data and a memory-stored digital roadway map, the vehicle controller maps the vehicle's real-time location to a vehicle roadway and concomitantly detects a lane merging event responsive to the vehicle's location and trajectory coinciding with a roadway lane segment that is merging with an adjacent roadway lane segment at a lane merging point of the vehicle roadway. Responsive to detecting a lane merging event, the vehicle controller determines a new mirror angle for the driver mirror and then commands the mirror actuator to move the driver mirror to the new mirror angle prior to the motor vehicle reaching the lane merging point.

For any of the disclosed vehicles, methods, and CRM, determining a new mirror angle may include retrieving a user-selected or vehicle-calibrated mirror angle from a resident memory device of the host motor vehicle, and then setting the new mirror angle as the user-selected or vehicle-calibrated mirror angle. As a further option, determining a new mirror angle may include determining a relative angle between the two merging lane segments and then calculating the new mirror angle in real-time based on the relative angle. Determining a new mirror angle may optionally include determining respective relative angles between a series of arcuately spaced lane locations of an arcuate lane segment and the adjoining lane segment, and then calculating a series of new mirror angles based on the respective relative angles between the adjoining lane segment and the arcuately spaced lane locations of the arcuate lane segment. In this instance, the mirror actuator is commanded to sequentially move the driver mirror to the new mirror angles prior to the motor vehicle reaching the lane merging point.

For any of the disclosed vehicles, methods, and CRM, the vehicle controller may command a resident driver feedback system of the motor vehicle to output an audible, visible, and/or haptic cue alerting the driver of the controller-automated movement of the driver mirror concurrent with the mirror actuator moving the driver mirror to the new mirror angle. As another option, the vehicle controller may communicate with a resident vehicle sensor array of the motor vehicle to receive therefrom sensor data indicative of an oncoming vehicle in the second lane segment. In this instance, the vehicle controller may command a driver feedback system to output an audible, visible, and/or haptic cue alerting the driver of the oncoming vehicle approaching in the second lane segment concurrent with the mirror actuator moving the driver mirror to the new mirror angle. As a further option, the vehicle controller may use the received sensor data to determine a target location of the oncoming vehicle relative to the real-time host vehicle location of the motor vehicle, and then calculate a second new mirror angle in real-time based on the oncoming vehicle's target location relative to the host vehicle's real-time location. In this instance, the vehicle controller may command the mirror actuator to move the driver mirror to the new mirror angle prior to the motor vehicle reaching the lane merging point.

For any of the disclosed vehicles, methods, and CRM, the vehicle controller may determine whether or not the new mirror angle exceeds a predefined maximum allowable mirror angle; if it does, the controller may responsively command the mirror actuator to move the driver mirror to the predefined maximum allowable mirror angle. As a further option, the vehicle controller may determine whether or not the host vehicle has reached the lane merging point and/or merged into second lane segment after the driver mirror was moved to the new mirror angle. If it has, the vehicle controller may responsively command the mirror actuator to move the driver mirror to a preset default position. As another option, the vehicle controller may respond to not detecting a lane merging event by determining whether or not the driver mirror is in a preset default position; if it is not, the vehicle controller may responsively command the mirror actuator to move the driver mirror to the preset default position. Prior to adjusting the driver mirror for a lane merging event, the vehicle controller may respond to detecting a lane merging event by first determining whether or not a lane merge assist mode is active. In this instance, commanding the mirror actuator to move the driver mirror to the new mirror angle may be further in response to the LMA mode being active.

For any of the disclosed vehicles, methods, and CRM, the host vehicle tracking device may be an onboard geolocation device (e.g., GPS transceiver or cellular trilateration module) that is mounted to the vehicle body and/or a handheld computing device (e.g., smartphone, plug-in navigation device, or tablet computer) that is located inside the vehicle body and communicatively connected to the vehicle controller. In this instance, the vehicle controller may determine if the onboard geolocation device is present in the subject host vehicle, is functioning properly, and/or is otherwise available to wirelessly receive the vehicle location data. If it is not, the controller may responsively determine if the handheld computing device is available to wirelessly receive the location data. Commanding the mirror actuator to move the driver mirror may be further in response to confirming that at least one of the onboard geolocation device or the handheld computing device is available.

For any of the disclosed vehicles, methods, and CRM, the digital roadway map may be an onboard roadway map that is stored in a resident memory device of the motor vehicle (e.g., Geographic Data File (GDF) map or Shared Data Access Library (SDAL) map stored by in-vehicle telematics unit), a plug-in roadway map that is stored in a memory device of a handheld computing device communicatively connected to the vehicle controller (e.g., APPLE® Maps or GOOGLE® Maps mobile application operating on smartphone), and/or an online roadway map that is wirelessly retrievable by the vehicle controller from a remote memory device (e.g., ONSTAR® Maps+ Navigation). In this instance, the vehicle controller may determine whether or not the onboard roadway map is readily accessible by the subject host vehicle, is retrievable by the host vehicle, and/or is otherwise available for mapping the host vehicle's real-time location to the vehicle roadway. If it is not, the vehicle controller may responsively determine whether or not the plug-in roadway map is available for mapping the host vehicle location to the vehicle roadway; if not, the controller may responsively determine if the online roadway map is available for mapping the host vehicle location to the vehicle roadway. Commanding the mirror actuator to move the driver mirror may be further in response to determining at least one of the onboard roadway map, the plug-in roadway map, or the online roadway map is available.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
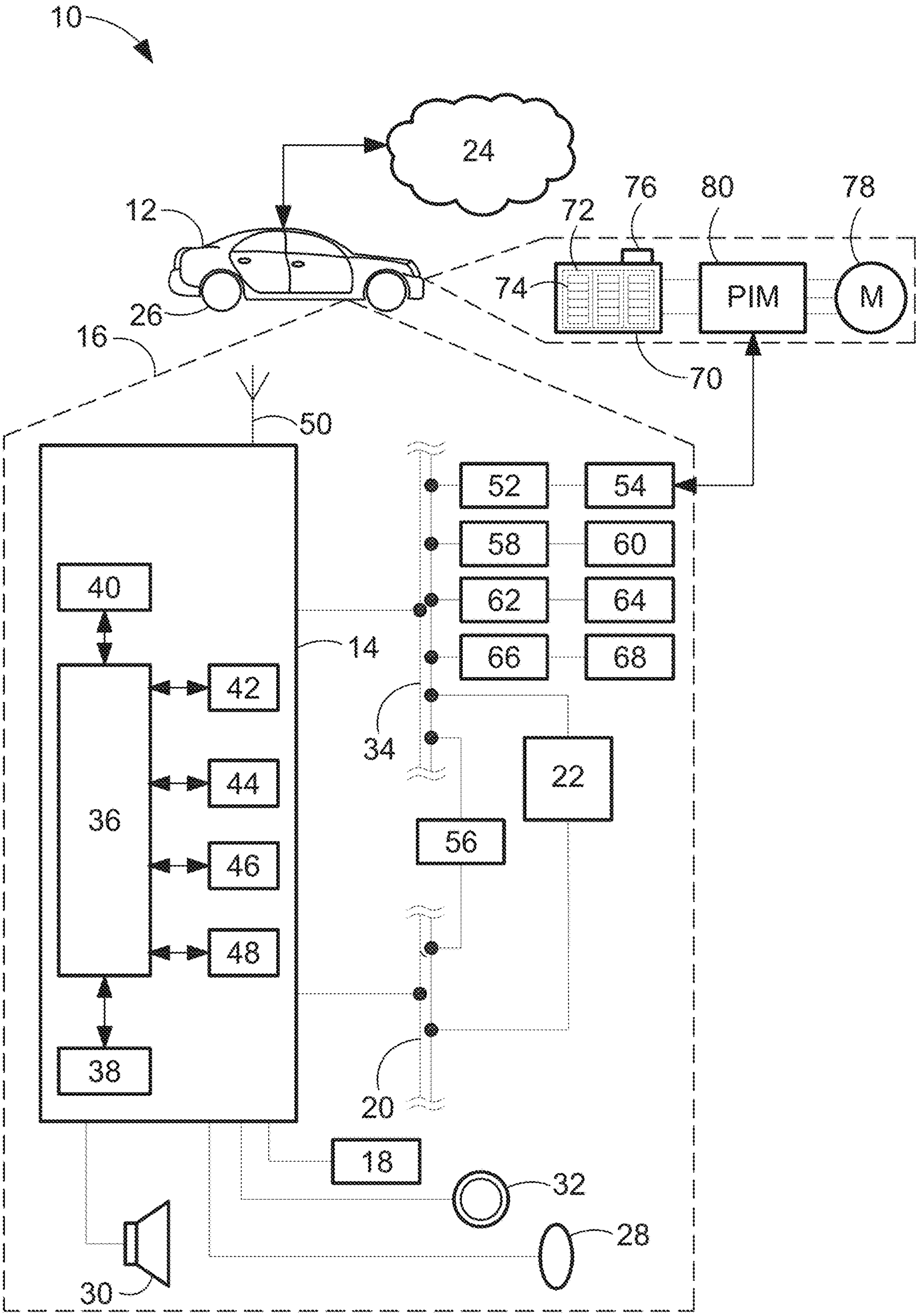
FIG. 1 is a partially schematic, side-view illustration of a representative motor vehicle with an automated driver mirror system and a network of in-vehicle controllers, sensing devices, and communication devices for provisioning automatic lane merging assistance in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short-is merely an exemplary application with which aspects of this disclosure may be practiced. In the same vein, execution of the present concepts using a driver-side vehicle sideview mirror while traversing a freeway on-ramp should be appreciated as a non-limiting implementation of disclosed features. As such, it will be understood that aspects of this disclosure may be implemented using any available driver mirror assemblies, may be executed for any lane-merge event, and may be incorporated into any logically relevant type of motor vehicle. Moreover, only select components of the motor vehicle and vehicle LMA system are shown and described in detail herein. Nevertheless, the vehicles and systems discussed below may include numerous additional and alternative features, and other available peripheral hardware, for carrying out the various methods and functions of this disclosure.

The representative vehicle 10 of FIG. 1 is originally equipped with a vehicle telecommunications and information ("telematics") unit 14 that wirelessly communicates, e.g., via cellular network, satellite service, wireless-enabled modem, etc., with a remotely located cloud computing host service 24 (e.g., ONSTAR®). Some of the other vehicle hardware components 16 shown generally in FIG. 1 include, as non-limiting examples, an electronic video display device 18, a microphone 28, audio speaker(s) 30, and assorted user input controls 32 (e.g., buttons, knobs, pedals, switches, touchpads, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal commands; the vehicle 10 may be equipped with an embedded voice-processing unit utilizing audio filtering, editing, and analysis modules. Conversely, the speaker 30 provides audible output to a vehicle occupant and may be either a stand-alone speaker dedicated for the telematics unit 14 or may be part of an audio system 22. The audio system 22 is connected to a network connection interface 34 and an audio bus 20 to receive analog information, rendering it as sound, via the one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, and other automated functions. For instance, telematics unit 14 may exchange signals with a Powertrain Control Module (PCM) 52, an Advanced Driver Assistance System (ADAS) module 54, an Autonomous Domain Control Unit (ADCU) 56, a Steering Control Module (SCM) 58, a Brake System Control Module (BSCM) 60, and assorted other vehicle ECUs, such as a Transmission Control Module (TCM), an Engine Control Module (ECM), a Sensor System Interface Module (SSIM), an Electronic Battery Control Module (EBCM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Cloud (V2C), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The vehicle speed sensor(s) 66 may be in the nature of a mechanical or electromagnetic transmission shaft sensor or electronic wheel speed sensor for detecting vehicle speed. The vehicle dynamics sensor(s) 68 may be in the nature of a single-axis or a triple-axis accelerometer, an angular rate sensor, an inclinometer, steering wheel angle sensor, brake sensor, inertial measurement unit (IMU), etc., for detecting longitudinal and lateral acceleration, yaw, roll, and/or pitch rates, steering angle, and other dynamics related parameters. The type, placement, number, and interoperability of the distributed array of in-vehicle sensors may be adapted, singly or collectively, to a given vehicle platform for achieving a desired level of automated vehicle operation.

To propel the motor vehicle 10, an electrified powertrain is operable to generate and deliver tractive torque to one or more of the vehicle's drive wheels 26. The powertrain is represented in FIG. 1 by a rechargeable energy storage system (RESS), which may be in the nature of a chassis-mounted traction battery pack 70, that is operatively connected to an electric traction motor (M) 78. The traction battery pack 70 is generally composed of one or more battery modules 72 each containing a cluster of battery cells 74, such as lithium-class, zinc-class, nickel-class, or organosilicon-class cells of the pouch, can, or cylindrical type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. The battery pack 70 may include an integrated electronics package, such as a wireless-enabled cell monitoring unit (CMU) 76, that enables on-module management, cell sensing, etc.

During operation of the motor vehicle 10—also referred to herein as "host vehicle" or "ego vehicle"—the vehicle driver may need to perform a lane-merge maneuver when driving in a roadway lane (e.g., freeway on-ramp) that is intersecting and combining with an adjacent roadway lane (e.g., freeway acceleration lane). For many lane merging events, the host vehicle lane is non-parallel to the adjacent roadway lane with which it is merging, such as an accurate or S-shaped highway off-ramp intersecting at an oblique angle with a highway service road or a major district crossroad. These roadway topologies may reduce lateral visibility and, thus, make it difficult for drivers to coordinate merging the host vehicle forward of and behind oncoming target vehicles in the adjacent lane. Differences in elevation between the host vehicle lane and adjacent roadway lane may further exacerbate driver visibility and awareness limitations.

Presented herein are smart vehicle systems and control logic for provisioning automated lane merge assist (LMA) features for facilitating lane merging maneuvers at roadway merge junctions. An in-vehicle LMA system may automatically adjust a rearview mirror and/or one or both sideview mirrors (collectively "driver mirror") of the host vehicle to help the driver better monitor traffic flow in the adjacent lane before reaching the merge point. A location-based activation trigger of the LMA system may employ multiple data sources for executing real-time vehicle geolocation and roadway mapping, including onboard, online, and plug-in devices. The LMA system may be set in different operating modes for varying levels of convenience, such as:

(1) Fixed LMA Mode: the LMA system executes a single adjustment to the driver mirror's orientation during a lane merging event; the adjusted "new" mirror angle may be preset by the manufacturer/LMA system or selected by the driver/owner;

(2) Dynamic LMA Mode: the LMA system executes a single adjustment to the driver mirror's orientation during a lane merging event; the new mirror angle may be determined during the LMA logic's runtime based on the relative angle between the host vehicle lane and the adjacent lane; and (3) Continuous LMA Mode: the LMA system executes multiple adjustments to the driver mirror's orientation; mirror orientation may be adjusted continually or continuously while the host vehicle is executing the merging maneuver depending on real-time position of host vehicle and geometry of the host vehicle lane.

Each of the above-enumerated operating modes may be supplemented with enhanced vehicle blind spot sensing and alert features. For instance, a side blind zone indicator may activate when there is a potential conflict between the host vehicle and an oncoming target vehicle approaching in the adjacent roadway lane. For some applications, a side blind zone region may be dynamically defined based on merge location geometry.

Figure 2:
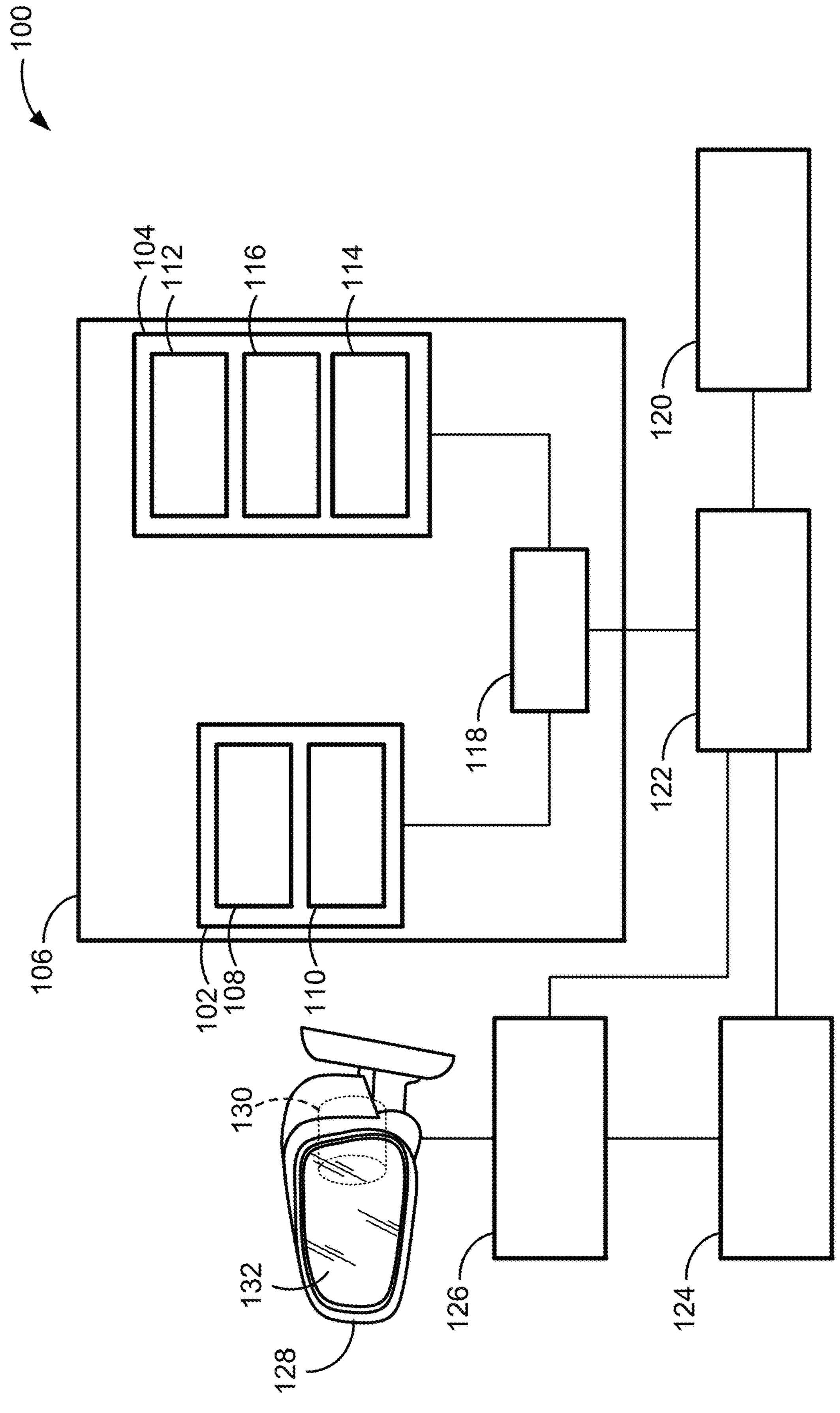
FIG. 2 is a diagrammatic illustration of a representative vehicle lane merge assist (LMA) system in accordance with aspects of the present disclosure.

FIG. 2 presents an example of a vehicle lane merge assist system 100 with which aspects of this disclosure may be practiced. In accord with the illustrated example, the vehicle LMA system 100 includes a host vehicle tracking module 102 for receiving real-time or near-real-time geodetic location data of the host motor vehicle, a digital roadway map module 104 for mapping the host vehicle's location to a vehicle roadway, and a vehicle localization module 118 that translates the received geodetic data and map data into a live host vehicle position, orientation and velocity relative to a drivable surface. The vehicle tracking module 102, roadway map module 104 and localization module 118 may be embedded software applications operating on an in-cabin driver feedback device 106, such as centerstack telematics unit 14 of FIG. 1, or may each be a dedicated microcontroller operating within an embedded vehicle controller network.

Host vehicle tracking module 102 may take on a variety of different form factors, such as an onboard geolocation device 108 that is mounted within the vehicle passenger compartment (e.g., GPS transceiver or cellular trilateration module) or may be a plug-in computing device 110 that is located inside the passenger compartment and wired or wirelessly connected to the host vehicle (e.g., smartphone, plug-and-play navigation device, tablet computer, laptop computer, etc.). Digital roadway map module 104 may be embodied as an onboard roadway map 112 that is stored in a resident memory device of the host vehicle (e.g., GDF or SDAL map stored by in-vehicle telematics unit). The roadway map module 104 may also be a plug-in roadway map 114 that is retrievable from a handheld computing device that is wired/wirelessly connected to the host vehicle (e.g., APPLE® Maps or GOOGLE® Maps mobile application operating on an occupant's smartphone), and/or an online roadway map 116 that is wirelessly retrievable by the host vehicle from the Internet (e.g., OPENSTREETMAP®) or a remote memory device (e.g., ONSTAR® Maps+ Navigation).

Vehicle LMA system 100 of FIG. 2 may utilize a vehicle localization module 118 that is embodied as an embedded navigation software application or a discrete navigation services module to provision real-time geodetic tracking and geolocation mapping services to obtain roadway topography, traffic, and speed limit information associated with the vehicle's current location. A component synchronization module 120 may coordinate automated lane merging assistance features with other vehicle subsystems, such as a blindside alert system, a haptic driver alert system, an LCA system, etc. A feature control module 122 may function as a centralized control node for governing and coordinating execution of the LCA system with the host vehicle's various other ADAS features. A vehicle occupant, be it the vehicle driver, owner, passenger, etc., may utilize a feature setting HMI module 124 to selectively activate and deactivate the LMA system, set user preferences within the LMA system, select one of the available LMA system operating modes, etc. The LMA system 100 communicates with a mirror actuator controller 126 to govern operation of a mirror actuator 130 (e.g., a bidirectional electric motor, a rotary actuator, a pneumatic cylinder, etc.) within a driver mirror assembly 128 to modulate a mirror yaw angle and/or a mirror pitch angle of a driver sideview mirror 132.

Figure 3A:
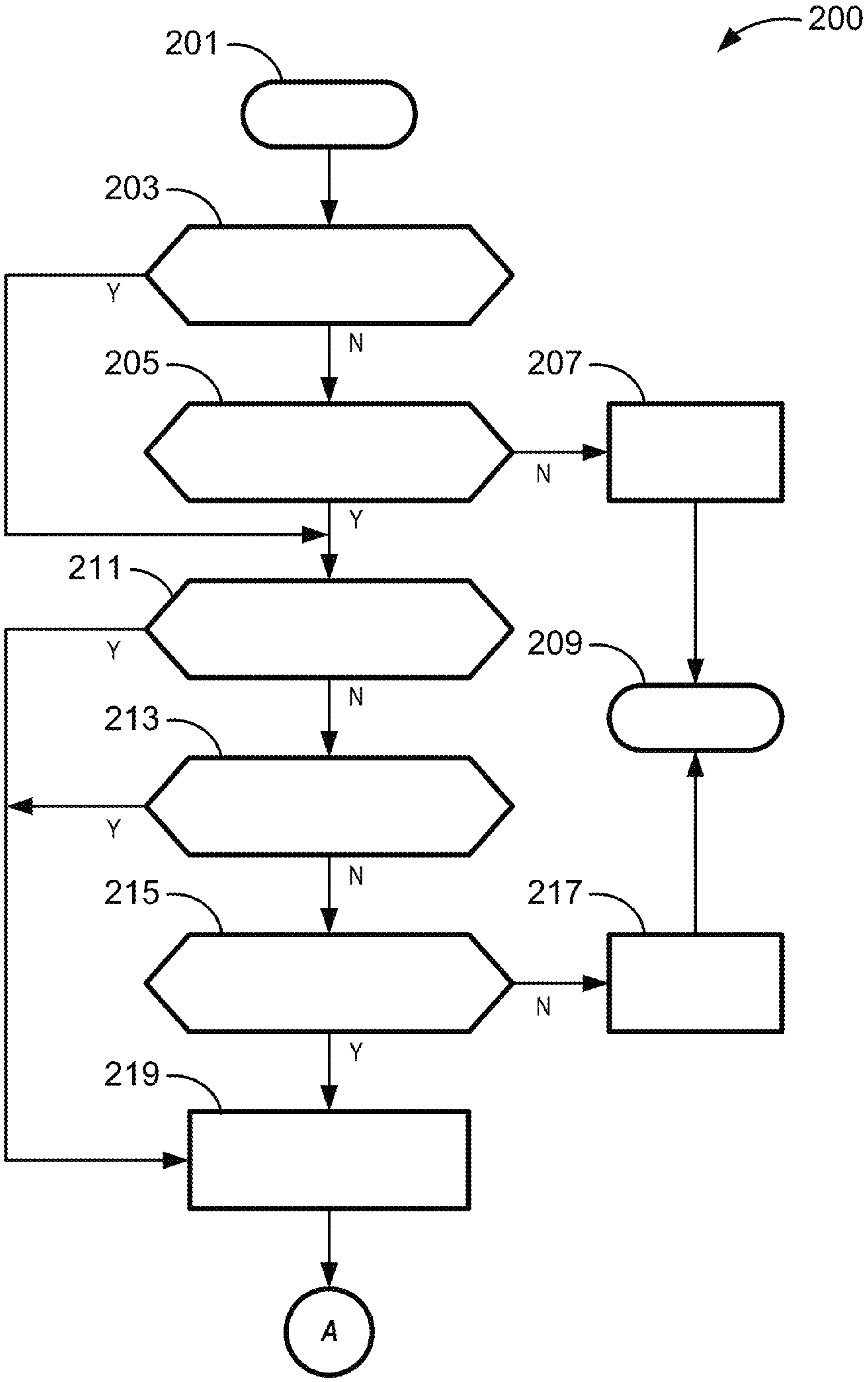
FIGS. 3A and 3B are flowcharts illustrating a representative vehicle control protocol for executing automated lane-merge assistance features, which may correspond to non-transient, memory-stored instructions that are executable by a resident or remote microcontroller, central processor, control module, programmable logic circuit, or other integrated circuit (IC) device or network of circuits/modules/microcontrollers/IC devices (collectively "controller") in accordance with aspects of the present disclosure.
Figure 3B:
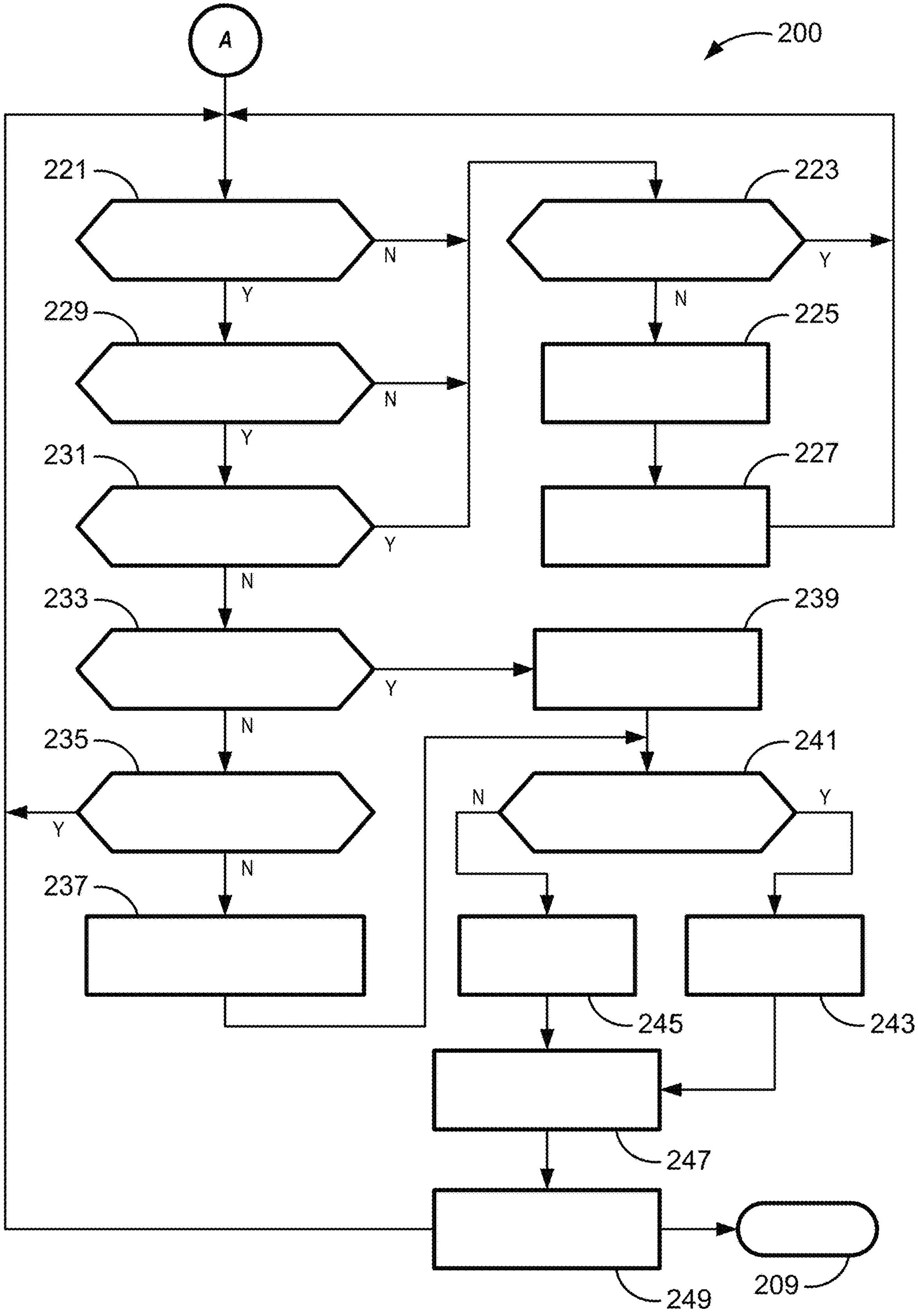

With reference next to the flowcharts of FIGS. 3A and 3B, an improved method or control protocol for provisioning automated lane-merge assistance for a host vehicle, such as automobile 10 of FIG. 1, using a resident ADAS system, such as vehicle LMA system 100 of FIG. 2, is generally described at 200 in accordance with aspects of the present disclosure. Some or all of the operations illustrated in FIGS. 3A and 3B and described in further detail below may be representative of an algorithm that corresponds to non-transient, processor-executable instructions that are stored, for example, in main or auxiliary or remote memory (e.g., resident vehicle memory device(s) 38 and/or remote cloud host service 24 database of FIG. 1). These instructions may be executed, for example, by a microcontroller, processing unit, programmable logic circuit, dedicated control module, or other module or device or network of controllers/modules/devices (e.g., vehicle CPU 36 and/or BO server-class computer of cloud host service 24), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 may begin at START terminal block 201 of FIG. 3A with memory-stored, processor-executable instructions for initializing a lane merging assistance procedure for aiding a driver during a lane merge event. This routine may be initialized in real-time, near real-time, continuously, systematically, sporadically, and/or at predefined time intervals, for example, each 10 or 100 milliseconds during use of the motor vehicle 10 of FIG. 1. As yet another option, terminal block 101 may initialize responsive to a user command prompt (e.g., input via telematics input controls 32), a resident vehicle controller prompt (e.g., from CPU 36), or a broadcast prompt signal received from a centralized back-office (BO) vehicle services system (e.g., from cloud host service 24). By way of non-limiting example, method

200 may automatically initialize upon detection of the host vehicle entering a freeway on-ramp, a highway off-ramp, or any other roadway segment known to be merging with another non-parallel lane segment. Upon completion of some or all of the control operations presented in FIGS. 3A and 3B, method 200 may advance to END terminal block 209 and temporarily terminate or, optionally, may loop back to terminal block 201 and run in a continuous loop.

Advancing from terminal block 201 to ONBOARD GPS decision block 203, method 200 may determine whether or not an onboard geolocation device (e.g., telematics GPS transceiver) is both present in the subject host vehicle and functioning properly (e.g., "available") to wirelessly receive real-time vehicle geolocation data. By way of non-limiting example, feature control module 122 of FIG. 2 may ping onboard geolocation device 108 and run a diagnostics check to ascertain if the geolocation device 108 is on and actively receiving geolocation data. If an onboard geolocation device is not available (Block 203=NO), method 200 may responsively execute PLUG-IN GPS decision block 205 to determine whether or not a wireless-enabled handheld computing device (e.g., BLUETOOTH® paired smartphone) is communicatively connected to the host vehicle and is available to wirelessly receive vehicle geolocation data. For instance, feature control module 122 may attempt to pair with plug-in computing device 110 and retrieve therefrom cellular trilateration data. If a plug-in geolocation device is also deemed unavailable (Block 205=NO), method 200 may responsively set a system fault flag in resident memory at NO GPS error process block 207; method 200 may thereafter proceed to terminal block 209 and temporarily terminate or may loop back to decision block 211 and attempt to retrieve a suitable map. Rather than executing decision blocks 203 and 205 sequentially, method 200 may simultaneously perform the two if/then conditional statement inquiries or, in at least some applications, may omit both decision blocks 203, 205 if the LMA system has already confirmed that host vehicle location services are available.

Upon determining that either an onboard geolocation device is available (Block 203=YES) or a plug-in geolocation device is available (Block 205=YES), method 200 may responsively execute ONBOARD MAP decision block 211 to determine whether or not an onboard roadway map (e.g., telematics-stored open street map) is readily accessible and retrievable by the subject host vehicle (e.g., "available") for mapping a host vehicle location to a vehicle roadway. If an onboard digital map is not available (Block 211=NO), method 200 may responsively execute PLUG-IN MAP decision block 213 to determine whether or not a plug-in roadway map (e.g., smartphone-stored APPLE® Maps or WAZE® mobile application) is available for mapping a host vehicle location to a vehicle roadway. If a plug-in digital map is not available (Block 213=NO), method 200 may responsively execute ONLINE MAP decision block 215 to determine whether or not an online roadway map (e.g., ONSTAR® Maps+ Navigation or GOOGLE® Maps online map service) is available for mapping a host vehicle location to a vehicle roadway. If an online roadway map is also not available (Block 215=NO), method 200 may responsively set a system fault flag in resident memory at NO MAP error process block 217; method 200 may thereafter temporarily terminate at terminal block 209. Rather than executing decision blocks 211, 213 and 215 sequentially, method 200 may simultaneously perform these three if/then conditional statement inquiries. It is also envisioned that method 200 may altogether omit decision blocks 211, 213 and 215 if the LMA system has already confirmed that a roadway mapping service is available.

After confirming that an onboard roadway map is available (Block 211=YES), a plug-in roadway map is available (Block 213=YES), or an online roadway map is available (Block 215=YES), method 200 may responsively execute HOST VEHICLE LOCATION subroutine 219 to locate the host vehicle on a map. For instance, vehicle localization module 118 of FIG. 2 may use location data received by the host vehicle tracking module 102 (e.g., GPS geodetic datum coordinates) and map data retrieved by the digital roadway map module 104 (e.g., open-source spatial database) to map the host vehicle's real-time location to a host road segment. Following page connector (A) of FIG. 3A to page connector (A) of FIG. 3B, method 200 thereafter executes FEATURE ENABLED decision block 221 to determine whether or not a lane merge assist mode is enabled on the host vehicle. For instance, vehicle feature control module 122 of FIG. 2 may communicate with feature setting HMI module 124 to ascertain if the driver has selectively enabled or disabled the vehicle LMA mode.

If LMA mode is not enabled (Block 221=NO), method 200 may advance to STANDARD POSITION decision block 223 of FIG. 3B to determine whether or not the driver mirror is currently oriented in a preset default position. The sideview mirror 132 of driver mirror assembly 128 of FIG. 2, for example, may have three available positions: (1) a standard "default" position: a mirror angle selected by a driver/owner/user and set in memory for normal driving scenarios; (2) a ramp position: a preset or actively determined mirror angle or series of mirror angles for executing a lane merging maneuver; and (3) a maximum position: a maximum allowable mirror angle dictated by the mechanical limits of the mirror assembly 128. If the driver mirror is positioned in the standard default position (Block 223=YES), method 200 may loop back to process block 219 or decision block 221. Conversely, method 200 of FIG. 3B may respond to a determination that the driver mirror is not positioned in the standard default position (Block 223=NO) by moving the driver mirror to the standard position at MIRROR DEFAULT process block 225. In accord with the illustrated example of FIG. 2, feature control module 122 may transmit a command signal to the mirror actuator controller 126 soliciting movement of the sideview mirror 132 to the standard position; mirror actuator controller 126 may concomitantly command the mirror actuator 130 to rotate the sideview mirror 132 to the corresponding mirror default pitch and yaw angles. At this juncture, method 200 may disable the lane merge assist mode at LMA OFF process block 227 (e.g., feature control module 122 sets feature status to "off" in HMI module 124) and loop back to block 219 or block 221.

Upon confirming that LMA mode is enabled (Block 221=YES), method 200 may advance to MERGE EVENT decision block 229 of FIG. 3B to determine whether or not the host vehicle is experiencing a lane merging event. By way of example, and not limitation, feature control module 122 of FIG. 2 may communicate with vehicle localization module 118 to actively track vehicle location and trajectory during operation of the automobile 10 of FIG. 1 to ascertain when the host vehicle's real-time location coincides with a roadway lane segment ("host lane") that is merging with an adjacent, non-parallel lane segment ("target lane") at a recognized lane merging point. One common example includes driving scenarios in which the host vehicle is traversing a freeway on-ramp and attempting to execute a lane change into the freeway's adjacent acceleration lane before the on-ramp ends. Responsive to a determination that the host vehicle is not undergoing a lane merging event (Block 229=NO), method 200 may responsively loop to decision block 223 of FIG. 3B and execute the operations described above with respect to blocks 223, 225 and 227.

After detecting a lane merging event (Block 229=YES), method 200 may respond by executing LANE EXIT decision block 231 to determine whether or not the host vehicle either merged into the adjacent target lane or has reached the merging point of the host and target lanes and has therefore left the host lane. Continuing with the examples illustrated in FIGS. 1 and 2, the feature control module 122 may communicate with vehicle localization module 118 to ascertain if the ego vehicle 10 has already executed a lane-merge maneuver or has encountered/passed the terminal end of the on-ramp and, thus, is now travelling in the target lane. Responsive to a determination that the host vehicle has left the host lane (Block 231=YES), method 200 may responsively loop to decision block 223 of FIG. 3B and, if appropriate, execute the operations described above with respect to blocks 223, 225 and 227.

With continuing reference to FIG. 3B, method 200 may execute CONTINUE ADJUSTMENT decision block 233 upon concluding that the subject host vehicle has not left the host lane (Block 231=NO). As a non-limiting example, feature control module 122 may output a visual or audible prompt to the driver to approve execution of the LMA assist features and/or choose a desired operating mode for the vehicle LMA system 100. Touchscreen input controls 32 of FIG. 1 may display user-selectable soft-touch buttons to ENABLE LMA or DISABLE LMA; if enabled, the telematics unit 14 may thereafter display user-selectable soft-touch buttons for choosing FIXED MODE, DYNAMIC MODE or CONTINUOUS MODE. Alternative system configurations may only prompt the user to enable/disable LMA, only prompt the user to select a desired operating mode, or may altogether omit decision block 233, e.g., in situations where the driver has already enabled LMA and an operating mode has already been chosen.

If the user chooses to not continue LMA mirror adjustment (Block 233=NO) the method 200 may respond by executing RAMP POSITION decision block 243 and correspondingly determining whether or not the driver mirror is presently oriented in the lane-merge (ramp) position. If it is (Block 235=YES), method 200 may loop back to decision block 221 and determine if the lane merge assist mode is enabled. If the driver mirror is not presently oriented in the lane-merge (ramp) position (Block 235=NO), method 200 may responsively execute NEW MIRROR ANGLE subroutine 237 and either retrieve a predefined "new" lane-merge (ramp) position or compute a calculated "new" lane-merge (ramp) position for the driver mirror. After confirming the occurrence of a lane merging event, for example, the feature control module 122 may call-up a default mirror angle for the driver mirror, which may be a user-selected mirror angle or a vehicle-calibrated mirror angle that is stored in resident cache memory. Alternatively, feature control module 122 may communicate with roadway map module 104 to derive roadway topography data to derive a relative angle between the host and target lane segments. The feature control module 122 may then retrieve a lookup table that lists a series of relative angles associated with respective new mirror angles; from this lookup table, the feature control module 122 selects the new mirror angle associated with the host-to-target relative angle. As yet a further option, the feature control module 122 may calculate a new mirror angle as a mathematical difference between the host-to-target relative angle and a current angle of the driver mirror.

If the user chooses to continue LMA mirror adjustment (Block 233=YES), method 200 may proceed to NEW MIRROR ANGLES subroutine 239 and calculate a series of new "new" lane-merge (ramp) positions. In order to perform the Continuous LMA Mode, e.g., for an arcuate host lane segment, the feature control module 122 of FIG. 2 may determine a series of respective relative angles between a series of arcuately spaced lane locations of the arcuate host lane segment and the adjoining target lane segment. Feature control module 122 then calculates a series of new mirror angles, each of which is based on a respective one of the relative angles between the adjoining lane segment and one of the arcuately spaced lane locations of the arcuate lane segment. Once calculated, the feature control module 122 may coordinate with the mirror actuator controller 126 to govern operation of the mirror actuator 130 to sequentially move the driver sideview mirror 132 to each of the new mirror angles in the series of new mirror angles before the host vehicle 10 reaching the lane merging point. New mirror angle determination may be context-based and therefore dependent on road geometry information from map databases (e.g., 2D geometry, 3D elevation, etc.), host vehicle trajectory, real-time speed, preset speed limits, target lane traffic, etc.

With continuing reference to FIG. 3B, method 200 may advance from subroutines 237 and 239 to MAX POSITION decision block 241 to determine whether or not the retrieved, calculated, or otherwise determined "new" lane-merge (ramp) position(s) of the driver mirror exceeds a predefined maximum allowable mirror angle ("maximum position"). Responsive to a determination that the new mirror angle(s) exceeds the predefined maximum allowable mirror angle (Block 241=YES), method 200 may execute USE MAX process block 243, set the new mirror angle to the maximum position, and command the mirror actuator to move the driver mirror to the predefined maximum allowable mirror angle at SET MIRROR signal output block 247. On the other hand, if the feature control module 122 confirms that the new mirror angle(s) do not exceed the predefined maximum allowable mirror angle (Block 241=NO), method 200 may execute USE NEW process block 245, set the new mirror angle to the determined "new" lane-merge (ramp) angle, and then command the mirror actuator to move the driver mirror to the lane-merge (ramp) angle at SET MIRROR signal output block 247.

After executing the LMA mirror adjustment feature at signal output block 247, method 200 may enable the lane merge assist mode at LMA ON process block 249 (e.g., feature control module 122 sets feature status to "on" in HMI module 124) and temporarily terminate at END terminal block 209. Prior to exiting the automated LMA control protocol presented in FIGS. 3A and 3B, the method 200 may determine, e.g., at process block 249 of FIG. 3B, if the subject host vehicle has reached the host-to-target lane merging point and/or has merged into the target lane after the driver mirror was moved to the new mirror angle. If either instance is true, the method 200 may automatically command the mirror actuator to move the driver mirror back to the preset default position (i.e., once the lane merging event has concluded, the host vehicle returns the driver mirror to its original position). As yet a further option, method 200 may supplement the automated repositioning of the driver mirror to the new mirror angle at signal output block 247 by having the feature control module 122 coordinate with component synchronization module 120 to govern activation of a resident driver feedback system of the host vehicle to output an audible, visible, and/or haptic cue that alerts the driver of the controller-automated movement of the driver mirror (i.e., so the driver is aware that their mirror is being moved by the LMA system 100 when they are executing a lane-merge maneuver).

During a lane merging event, the method 200 may provide processor-executable instructions for the ADAS module 54 to coordinate with the SSIM to receive sensor data from the on-vehicle sensor array (e.g., cameras 62, range sensors 64, etc.) for detecting and tracking any oncoming vehicles in the target lane segment. When executing the LMA mirror adjustment feature (e.g., at signal output block 247) and moving the driver mirror to the new mirror angle, the feature control module 122 may coordinate with component synchronization module 120 to govern activation of a resident driver feedback system to output an audible, visible, and/or haptic cue that alerts the driver of one or more oncoming target vehicles approaching in the target lane. In this instance, via the feature control module 122 may use the sensor data to derive a respective target location of each oncoming target vehicle relative to the host vehicle. The feature control module 122 may then calculate one or more (second) new mirror angles in real-time based on the target location(s) of the oncoming target vehicles relative to the real-time location of the host vehicle. The host vehicle may then automate movement of the driver mirror to the one or more new mirror angles prior to the host vehicle reaching the lane merging point.

Disclosed features may be employed outside of lane merging events. For instance, vehicle-automated driver mirror movement may help to support a variety of different vehicle back-up driving maneuvers, such as backing out of a driveway or parking space in which a different viewing angle is needed compared to a conventional setting (e.g., driveway is at an oblique angle compared to road). Another example may include a backing out maneuver where there is a target object of interest (e.g., obstruction, pedestrian, etc.); the host vehicle may automatically adjust one or more mirror positions to improve visibility (e.g., animal in proximity of backing vehicle).

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed is:

1. A method of operating a motor vehicle with a vehicle body, a driver mirror attached to the vehicle body, a mirror actuator coupled to the driver mirror, and a vehicle controller connected to the mirror actuator, the method comprising:

receiving, via the vehicle controller from a host vehicle tracking device, location data indicative of a host vehicle location of the motor vehicle;

mapping, via the vehicle controller using the location data and a digital roadway map, the host vehicle location to a vehicle roadway;

detecting, via the vehicle controller, a lane merging event responsive to the host vehicle location coinciding with a first lane segment merging with a second lane segment at a lane merging point, the first lane segment including an arcuate lane segment;

determining, via the vehicle controller responsive to detecting the lane merging event, a new mirror angle for the driver mirror, the determining including:

determining respective relative angles between a series of arcuately spaced lane locations of the arcuate lane segment and the second lane segment, and calculating multiple new mirror angles based on the respective relative angles between the second lane segment and the series of arcuately spaced lane locations of the arcuate lane segment;

commanding, via the vehicle controller, the mirror actuator to sequentially move the driver mirror to the multiple new mirror angles prior to the motor vehicle reaching the lane merging point; and commanding, via the vehicle controller concurrent with the mirror actuator moving the driver mirror, a driver feedback system of the motor vehicle to output an audible, visible, and/or haptic cue indicating controller-automated movement of the driver mirror.

2. The method of claim 1, wherein determining the new mirror angle further includes:

retrieving a user-selected mirror angle or a vehicle-calibrated mirror angle from a resident memory device of the motor vehicle; and setting the new mirror angle as the user-selected mirror angle or the vehicle-calibrated mirror angle.

3. The method of claim 1, wherein determining the multiple new mirror angles includes:

determining, via the vehicle controller, the respective relative angles between the first lane segment and the second lane segment in real-time; and calculating the multiple new mirror angles in real-time based on the real-time relative respective angles between the first and second lane segments.

4. The method of claim 1, further comprising:

receiving, via the vehicle controller from a sensor array attached to the vehicle body of the motor vehicle, sensor data indicative of an oncoming vehicle in the second lane segment; and commanding, via the vehicle controller concurrent with the mirror actuator moving the driver mirror to the new mirror angles, a driver feedback system to output an audible, visible, and/or haptic cue indicating the oncoming vehicle is approaching in the second lane segment.

5. The method of claim 4, further comprising:

determining, via the vehicle controller using the sensor data, a target location of the oncoming vehicle relative to the host vehicle location of the motor vehicle;

calculating a second new mirror angle in real-time based on the target location relative to the host vehicle location; and commanding, via the vehicle controller, the mirror actuator to move the driver mirror to the second new mirror angle prior to the motor vehicle reaching the lane merging point.

6. The method of claim 1, further comprising:

determining, via the vehicle controller, if the new mirror angle exceeds a predefined maximum allowable mirror angle, wherein commanding the mirror actuator includes commanding the mirror actuator to move the driver mirror to the predefined maximum allowable mirror angle responsive to a determination that the new mirror angle exceeds the predefined maximum allowable mirror angle.

7. The method of claim 1, further comprising;

determining, via the vehicle controller after commanding the mirror actuator to move the driver mirror to the new mirror angles, if the motor vehicle has reached the lane merging point and/or merged into the second lane segment; and commanding, via the vehicle controller in response to a determination that the motor vehicle has reached the lane merging point and/or merged into the second lane segment, the mirror actuator to move the driver mirror to a preset default position.

8. The method of claim 1, further comprising;

determining, via the vehicle controller responsive to not detecting the lane merging event, if the driver mirror is in a preset default position; and commanding, via the vehicle controller in response to a determination that the driver mirror is not in the preset default position, the mirror actuator to move the driver mirror to the preset default position.

9. The method of claim 1, further comprising determining, via the vehicle controller responsive to detecting the lane merging event, if a lane merge assist (LMA) mode is enabled, wherein commanding the mirror actuator to move the driver mirror to the new mirror angle is further in response to the LMA mode being enabled.

10. The method of claim 1, wherein the host vehicle tracking device includes an onboard geolocation device mounted to the vehicle body and/or a handheld computing device located inside the vehicle body, the method further comprising:

determining, via the vehicle controller, if the onboard geolocation device is available to wirelessly receive the location data; and determining, via the vehicle controller responsive to a determination that the onboard geolocation device is not available, if the handheld computing device is available to wirelessly receive the location data, wherein commanding the mirror actuator to move the driver mirror to the new mirror angle is further in response to determining at least one of the onboard geolocation device is available or the handheld computing device is available.

11. The method of claim 1, wherein the digital roadway map includes an onboard roadway map stored in a resident memory device of the motor vehicle, a plug-in roadway map stored in a memory device of a handheld computing device, and/or an online roadway map wirelessly retrievable from a remote memory device, the method further comprising:

determining, via the vehicle controller, if the onboard roadway map is available for mapping the host vehicle location to the vehicle roadway;

determining, via the vehicle controller responsive to a determination that the onboard roadway map is not available, if the plug-in roadway map is available for mapping the host vehicle location to the vehicle roadway; and determining, via the vehicle controller responsive to a determination that the plug-in roadway map is not available, if the online roadway map is available for mapping the host vehicle location to the vehicle roadway, wherein commanding the mirror actuator to move the driver mirror to the new mirror angle is further in response to determining at least one of the onboard roadway map, the plug-in roadway map, or the online roadway map is available.

12. A non-transient, computer-readable medium storing instructions executable by a vehicle controller of a motor vehicle, the motor vehicle including a vehicle body, a driver mirror attached to the vehicle body, and an electric mirror motor communicatively connected to the vehicle controller and drivingly coupled to the driver mirror, the instructions, when executed, causing the vehicle controller to perform operations comprising:

receiving, from a wireless-enabled host vehicle tracking device in the motor vehicle, location data indicative of a host vehicle location of the motor vehicle;

mapping, using the received location data and a memory-stored digital roadway map, the host vehicle location to a vehicle roadway;

detecting a lane merging event responsive to the host vehicle location coinciding with a first lane segment of the vehicle roadway merging with a second lane segment of the vehicle roadway at a lane merging point, the first lane segment including an arcuate lane segment;

determining, responsive to detecting the lane merging event, multiple new mirror angles for the driver mirror by:

determining respective relative angles between a series of arcuately spaced lane locations of the arcuate lane segment and the second lane segment, and calculating the new mirror angles based on the respective relative angles between the second lane segment and the series of arcuately spaced lane locations of the arcuate lane segment;

commanding the electric mirror motor to sequentially move the driver mirror to the new mirror angles prior to the motor vehicle reaching the lane merging point; and commanding a driver feedback system of the motor vehicle to output an audible, visible, and/or haptic cue indicating controller-automated movement of the driver mirror concurrent with the mirror actuator moving the driver mirror to the new mirror angles.

13. A motor vehicle, comprising:

a vehicle body;

a plurality of road wheels attached to the vehicle body;

a prime mover attached to the vehicle body and configured to drive at least one of the road wheels to thereby propel the motor vehicle;

a mirror assembly including a driver mirror attached to the vehicle body and a mirror actuator drivingly coupled to the driver mirror; and a vehicle controller programmed to:

receive, from a host vehicle tracking device, location data indicative of a host vehicle location of the motor vehicle;

map, using the location data and a digital roadway map, the host vehicle location to a vehicle roadway;

detect a lane merging event responsive to the host vehicle location coinciding with a first lane segment merging with a second lane segment at a lane merging point of the vehicle roadway, the first lane segment including an arcuate lane segment;

determine, responsive to detecting the lane merging event, a new mirror angle for the driver mirror, the determining including:

determining respective relative angles between a series of arcuately spaced lane locations of the arcuate lane segment and the second lane segment, and calculating multiple new mirror angles based on the respective relative angles between the second lane segment and the series of arcuately spaced lane locations of the arcuate lane segment;

command the mirror actuator to sequentially move the driver mirror to the new mirror angles prior to the motor vehicle reaching the lane merging point; and command a driver feedback system of the motor vehicle to output an audible, visible, and/or haptic cue indicating controller-automated movement of the driver mirror concurrent with the mirror actuator moving the driver mirror.

14. The motor vehicle of claim 13, wherein determining the new mirror angle further includes:

retrieving a user-selected mirror angle or a vehicle-calibrated mirror angle from a resident memory device of the motor vehicle; and setting the new mirror angle as the user-selected mirror angle or the vehicle-calibrated mirror angle.

15. The motor vehicle of claim 13, wherein determining the new mirror angle further includes:

determining a real-time vehicle speed of the motor vehicle; and calculating the new mirror angles in real-time based on the real-time vehicle speed of the motor vehicle.

16. The motor vehicle of claim 13, wherein the vehicle controller is further programmed to command, concurrent with the mirror actuator moving the driver mirror to the new mirror angle, a driver feedback system of the motor vehicle to output an audible, visible, and/or haptic cue indicating controller-automated movement of the driver mirror.

17. The motor vehicle of claim 13, wherein the vehicle controller is further programmed to determine if the new mirror angle exceeds a predefined maximum allowable mirror angle, and wherein commanding the mirror actuator includes commanding the mirror actuator to move the driver mirror to the predefined maximum allowable mirror angle responsive to a determination that the new mirror angle exceeds the predefined maximum allowable mirror angle.

18. The motor vehicle of claim 13, further comprising a sensor array and a driver feedback system attached to the vehicle body, wherein the vehicle controller is further programmed to:

receive, from the sensor array, sensor data indicative of an oncoming vehicle in the second lane segment; and concurrent with the mirror actuator moving the driver mirror to the new mirror angles, command the driver feedback system to output an audible, visible, and/or haptic cue indicating the oncoming vehicle is approaching in the second lane segment.

19. The motor vehicle of claim 13, wherein the vehicle controller is further programmed to;

determine if the motor vehicle has reached the lane merging point and/or merged into the second lane segment; and in response to a determination that the motor vehicle has reached the lane merging point and/or merged into the second lane segment, command the mirror actuator to move the driver mirror to a preset default position.

* * * * *